Feb. 6, 1934.   W. SMALLEY   1,945,757
APPARATUS FOR CONTROLLING THE FLOW OF FLUIDS
Filed Dec. 22, 1930   2 Sheets-Sheet 1

INVENTOR:
W. Smalley
By: Marks & Clerk
Attys.

Patented Feb. 6, 1934

1,945,757

UNITED STATES PATENT OFFICE 1,945,757

APPARATUS FOR CONTROLLING THE FLOW OF FLUIDS

William Smalley, London, England, assignor to The Paterson Engineering Company, Limited, London, England Application December 22, 1930, Serial No. 504,136, and in Great Britain February 19, 1930

9 Claims. (Cl. 210—31)

This invention relates to apparatus for controlling the flow of fluids and while it is particularly designed to control the proportioning of chlorine addition to water it might be applied with equal effect and like advantage in any situation where variations in the flow of liquid are to be utilized to vary the addition of another liquid or of a gas thereto or otherwise proportionally vary the flow of a fluid.

The problem which the invention seeks to solve presents no difficulties where a pressure head is available as by means of a venturi a differential head can be set up which varies with the flow and which can be directly utilized to control a diaphragm for controlling the flow of a liquid or gas.

This invention has for its object to devise a simple and effective means of proportionally controlling the chlorine flow where no pressure head is available to act directly on the control mechanism.

The invention consists in apparatus for controlling the flow of a fluid comprising a diaphragm or like control device and a variable weight for operating said control, the weight acting being automatically proportioned to the flow of the fluid, the variations in which determine the control to be effected.

The invention also consists in apparatus of the above character in which a diaphragm or like control device is actuated by a weight on a beam, the effective amount of the weight or its position in relation to the fulcrum of the beam being determined automatically in accordance with variations in the flow of the control liquid.

Further features of the invention will be apparent from the description given hereafter.

The invention will now be described with reference to the accompanying drawings in which:—

Figure 1:
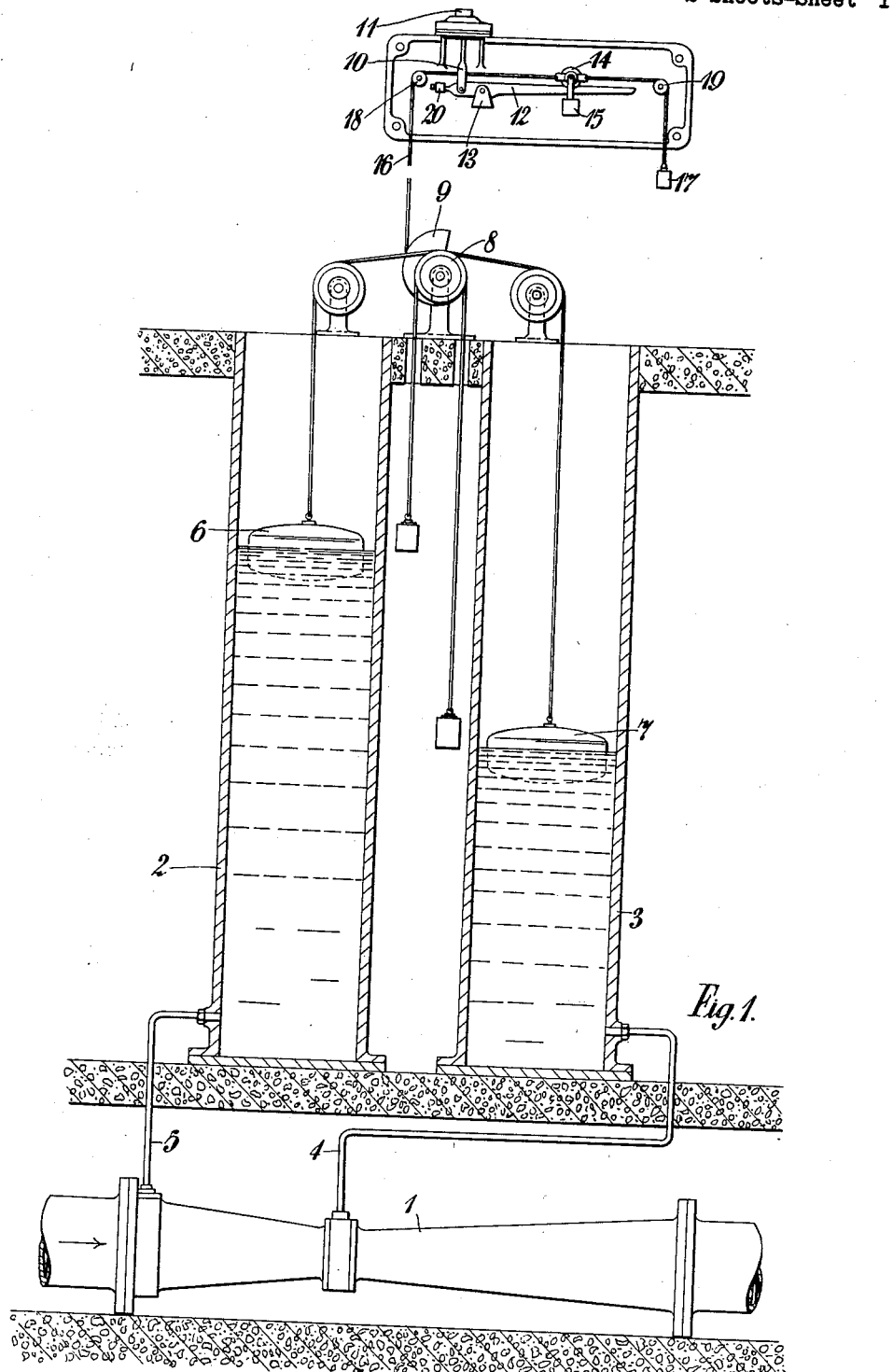
Figure 1 shows the invention when used with a Venturi tube.

In carrying my invention into effect in one convenient manner, as shown in Figure 1 for example when producing an apparatus for proportioning the addition of chlorine to water, I arrange that the water shall pass through a veturi 1 having two float receptacles 2, 3 communicating therewith by pipes 4, 5, one of which 4 is arranged at the throat of the venturi while the other 5 is on the upstream side of the throat.

In each of these receptacles 2, 3 I arrange floats 6, 7 which are adapted to operate by cords or the like a suitable differential mechanism 8 carrying a cam 9 which does not, as usual, actuate the chlorine control means but varies the effective weight acting upon a pin or other like device 10 which in turn acts upon the diaphragm or like control 11 for the purpose of varying the rate of flow of the chlorine gas.

In the construction illustrated the said pin or like member 10 is carried upon a beam 12 at one side of the fulcrum 13 thereof and upon the other side of the fulcrum the beam is constructed to take a suitable carriage 14 from which is suspended or upon which is mounted a weight 15, the carriage being operated from the cam 9 on the differential 8 by means of a suitable steel tape or other flexible connection 16 connected to one side of the carriage while the other side is connected to a suitable counterweight 17 by a similar steel tape or the like, the two tapes being guided by suitable pulleys 18, 19 mounted upon some fixed portion of the apparatus.

The movement of the weight 15 is so arranged by suitably shaping the cam 9 that the flow of gas through the control device 11 is at all times proportional to the flow of water through the Venturi tube.

The beam 12 is provided with an adjustable counterweight 20 by means of which an accurate initial balance may be obtained or by means of which any initial adjustment of the rate of the flow of chlorine gas may be effected and thereafter the rate of flow of gas is automatically controlled in relation to the rate of flow of water by movement of the weight 15 in one direction or the other along the beam as dictated by the differential mechanism controlled by the floats.

All the moving parts, such as pulleys, carriage and bearing of the beam on its fulcrum, as also the bearing of the weight upon the carriage, are preferably provided with ball or like anti-friction bearings so as to reduce the frictional resistance in the system to a minimum and, if desired, the beam may be controlled by a small dash pot in order to check any tendency for the beam to vibrate or hunt.

In some cases it is found that the cam 9 on the differential which operates the flexible connection 16 may be dispensed with.

It is to be understood that the device described above may be conveniently employed where the water flows from one tank or reservoir into another through a submerged orifice, in which case the floats would be arranged to ride upon the surface of the water in the two tanks or reservoirs.

Figure 2:
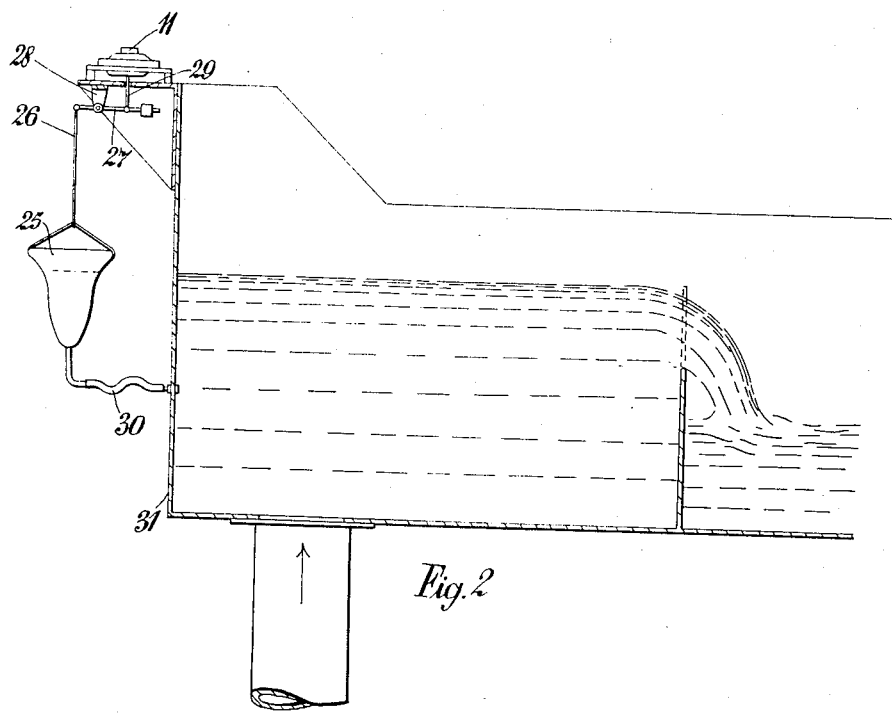
Figure 2 shows the invention when used with a weir.

In an alternative construction of the invention, as illustrated in Figure 2, when dealing with a weir flow instead of with a Venturi flow, I may arrange for the variable effective weight acting upon the chlorine control device 11 by providing a member 25 suspended by a flexible cord or the like 26 from the beam 27 which is pivotally mounted upon a bracket 28 fixed to the support carrying the control device 11. The beam 27 is connected to the control device by means of a pin or link 29. The member 25 is arranged with a flexible connector 30 to a measuring tank or other receptacle 31 containing water which flows over a weir, the said member 25 being suitably contoured so that as the height of the liquid in the tank or receptacle varies with the flow so will the weight acting upon the control device 11 be varied by the varying liquid content of the member.

Instead of suspending the member 25 from the end of the beam 27 it may be connected directly through the pin 29 or the like to the control device 11.

It will be understood, however, that the foregoing details of construction are given purely by way of illustration to indicate the nature of the invention and since the invention consists broadly in acting upon the control device by an effective weight which is varied in proportion to the control required it will be evident that numerous modifications may be introduced for the purpose of obtaining such automatically variable weight depending upon the particular application of the invention or any practical requirements that may have to be fulfilled.

Having now described my invention, what I claim as new and desire to secure by Letters Patent is:—

1. Apparatus for controlling the admixture of a gas with a flowing liquid comprising a controlling valve for the gas, a control beam mounted to swing about a fulcrum and actuate said valve, a weight movable along said beam to regulate the movement of the valve, and a differential pressure device associated with the flow of the liquid and connected with said weight to vary the effect of the weight on the valve in response to varying pressure conditions.

2. Apparatus for controlling the admixture of a gas with a flowing liquid comprising a controlling valve for regulating the flow of the gas, movable operating means responsive to varying pressure conditions in the flow of the liquid, mechanism interposed between the valves and the actuating means including a controlling beam mounted to swing about the fulcrum and actuate said valve, a weight movable along said beam to regulate the movement of said valve, and means operatively connecting the weight with the actuating means so as to vary the effect of the weight on the valve consistent with the varying pressure conditions.

3. Apparatus as claimed in claim 2, wherein the means for operably connecting the weight with the actuating means includes a flexible tape, and a counterbalancing weight operatively connected with the other side of the weight.

4. Apparatus as claimed in claim 1, wherein a pin connects the valve and the beam and is situated on the side of the fulcrum opposite to that on which the weight is positioned.

5. Apparatus as claimed in claim 1, wherein a counterbalancing weight is adjustably mounted on the beam to effect an accurate initial balancing of the beam and the rate of flow of the gas by the valve.

6. Apparatus as claimed in claim 1, wherein the differential mechanism includes a cam member and wherein the flexible connection is provided between the cam member and the adjustable weight, and the counterbalancing weight flexibly connecting with the adjustable weight.

7. Apparatus for controlling the admixture of a gas with a flowing liquid comprising a diaphragm valve regulating the flow of gas, a fulcrumed lever acting on said diaphragm valve to regulate the flow of gas, a weight acting on said fulcrumed lever, and means for varying the magnitude of the force applied by said weight depending upon the volume of liquid flowing.

8. Apparatus for controlling the admixture of a gas with a flowing liquid comprising a valve for regulating the flow of the gas, a beam mounted for rocking movement about a fulcrum and having one arm thereof directly connected with the valve, gravitational means associated with the other arm of the beam for regulating movement of the beam and hence the operation of the valve, and means actuated in accordance with variations in the flow of the liquid for varying the gravitational action of said gravitational means upon the beam whereby the valve is regulated in accordance with such variations.

9. Apparatus for controlling the admixture of a gas with a flowing liquid comprising a diaphragm type valve regulating the flow of the gas, a beam mounted for rocking movement about a fulcrum and having one arm thereof directly connected with the valve, a contoured bucket connected with the other arm of the beam, and a flexible conduit interconnecting the bucket with the flowing liquid whereby variations in volume of the liquid flow will cause corresponding variations in the quantity of liquid contained in the bucket and hence gravitational force to be applied by the said bucket to the beam in accordance with the volume of liquid flow.

WILLIAM SMALLEY.